United States Patent Office 3,380,624
Patented Apr. 30, 1968

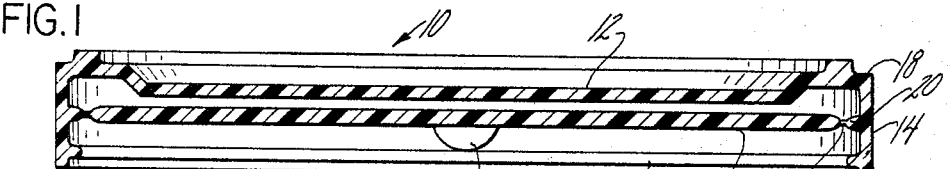
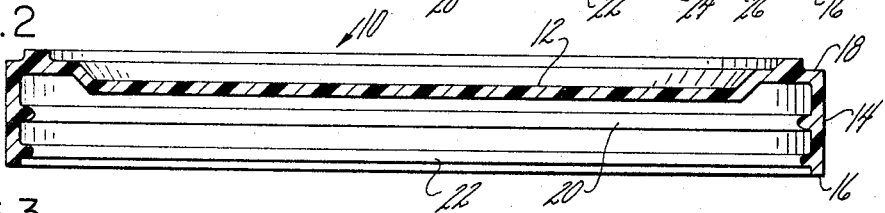
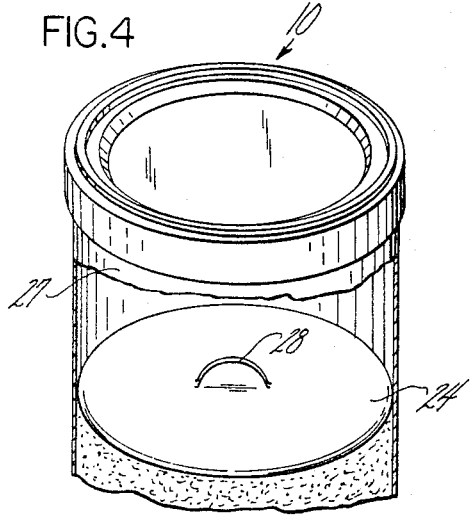
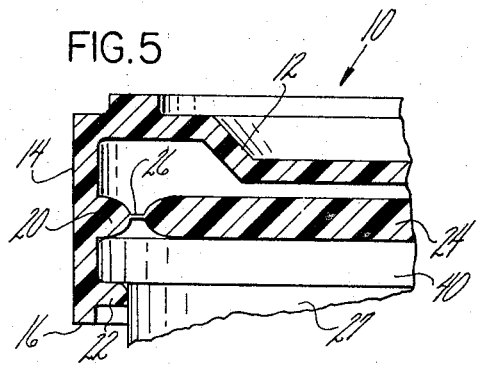
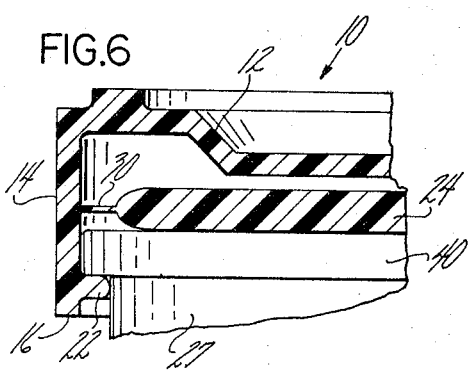
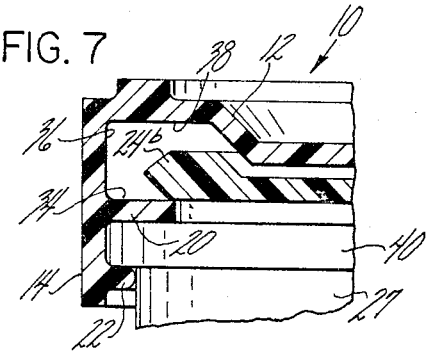
INVENTOR.
GILBERT LINCOLN
RICHARD C. LINCOLN JR.

3,380,624
CONTAINER COVER ASSEMBLY
Gilbert Lincoln, 30 Braintree Drive, West Hartford, Conn. 06117, and Richard C. Lincoln, Jr., 31 Woodland St., Hartford, Conn. 06105
Filed Apr. 10, 1967, Ser. No. 629,487
6 Claims. (Cl. 220—93)

ABSTRACT OF THE DISCLOSURE

The invention comprises a cover assembly for a cylindrical container and includes a cover comprising an annular central portion formed with a peripheral flange having a pair of axially spaced, annular ribs on the inside surface thereof. A removable, annular element is supported within the cover by one of said ribs between the outer edge of the flange and the annular central portion. The other of said ribs cooperates with one end of a cylindrical container to secure the assembly in position on the container. The annular element is dimensioned whereby its diameter is slightly less than the inside diameter of the container permitting sliding movement thereof within the container when removed from the cover assembly to function independently thereof.

Summary of invention

This invention relates to covers for containers and more particularly to a cover assembly made of a flexible material adapted for use with a cylindrical container and including a removable annular element or follower initially secured within said cover but adapted for sliding movement within the container when removed from said cover.

It is well known that the shelf life of certain foods such as coffee or the like is limited once the container holding the goods has been opened, exposing the contents thereof to the ambient atmosphere. For example, recent research indicates that the average can of ground coffee as generally used in the home is in use for twelve (12) days after it is first opened. It is also known that coffee, especially ground coffee, is deleteriously affected by exposure to the atmosphere—the greater the exposure, the greater the effect. Coffee loses both its flavor and its fragrant aroma by exposure to the atmosphere, the rate of such loss varying with the time and degree of exposure. The recent adopted practice of most coffee suppliers in providing snap-on, flexible plastic caps to protect the contents of a can of coffee has been helpful in reducing the rate of deterioration but only insofar as it shields the contents of the container by closing one end thereof. The coffee within the container continues to be exposed to the atmosphere within the container entrapped between the goods and the plastic cover. The present invention provides a snap-on plastic cover assembly for use in retarding the deterioration of the contents of a container and includes a removable element, or follower, normally carried in the assembly and secured to the container prior to opening but which is insertable into the container and adapted to rest on the surface of its contents, thereby shielding the goods from the atmosphere within the container as well as from the ambient room atmosphere.

A general object of the present invention is to provide a cover assembly for a cylindrical container which is adapted to be removably secured to one end thereof and which also includes a removable, annular element or follower dimensioned to be received within the container, and wherein the removable element is initially carried within the assembly between the afosesaid cover and the lid of the container, but which upon removing the container lid functions to shield the contents of the container from the ambient atmosphere.

The drawings show a preferred embodiment of the invention and such embodiment will be described, but it will be understood that various changes may be made from the construction disclosed and that the drawing and the description are not to be construed as defining or limiting the scope of the invention, the claims forming a part of the specification being relied upon for that purpose.

FIG. 1 is a vertical sectional view of the cover assembly of the present invention illustrating the cover portion, annular flange, supporting ribs and annular follower element supported within the assembly.

FIG. 2 is a view similar to that of FIG. 1 but with the annular follower element removed therefrom.

FIG. 3 is a vertical sectional view of the annular follower element shown removed from the cover assembly.

FIG. 4 is a fragmentary view in partial section of a cylindrical container to which a cover assembly of the present invention has been secured, showing the follower element removed from the assembly and in position within the container shielding the contents thereof from the ambient atmosphere.

FIG. 5 is an enlarged fragmentary sectional view of the cover assembly illustrating a preferred means of securing the assembly to a conventional cylindrical container of the type having a rolled bead surrounding the ends thereof.

FIG. 6 is an enlarged, fragmentary view in vertical section of an alternate form of the present invention wherein the follower element is supported within the flange by an annular rib of reduced cross-section comprising a tear strip to facilitate removal of the follower from the assembly.

FIG. 7 is an enlarged fragmentary view similar to that of FIG. 6 showing, however, still another alternate form of the present invention wherein the annular follower element is not formed integrally with its supporting rib but is removably supported upon the rib within a chamber formed by the rib, flange, and undersurface of the cover portion.

A preferred embodiment of the present invention is shown in FIGS. 1 through 5, wherein my novel cover assembly 10 includes an annular body portion 12 surrounded at its periphery by a depending, integral flange 14. The flange 14 depends substantially normal to the portion 12, its outer edge terminating in spaced relation thereto as at 16, the plane containing the edge 16 being substantially parallel with the plane of the body portion 12. On the inside wall of the flange intermediate the outer edge 16 and the other flange edge 18 which is integral with the body portion 12, I have provided a pair of axially spaced, inwardly directed ribs 20 and 22. As shown in the drawing, the rib 22 is adjacent to the edge 16 while the rib 20 is formed intermediate the edges 16 and 18.

An annular follower element 24 is formed integral with the rib 20, separated therefrom by a narrow area 26 of reduced cross-section. The area 26 of reduced cross-section functions to permit ready removal of the follower 24 from the cover assembly 10. Additional means such as an embedded wire, or the like (not shown) may be provided adjacent to, or in the area 26 to facilitate separation of the follower element 24 from the rib 20. The follower 24 is dimensioned whereby its diameter is slightly less than the inside diameter of a container 27 to which the assembly 10 is to be secured. A centrally disposed tab or flap 28, formed on the follower aids in its removal from the cover assembly as well as its use within the container.

In FIG. 6 I have shown the supporting means securing the follower 24 to the cover assembly 10 as comprising a band 30 of reduced cross-section surrounding the periphery of the follower and integral with the inside wall of the flange 14. The band 30 also functions as a tear strip which is readily removable, permitting convenient removal of the follower 24 from the assembly 10 and may also be formed with embedded wire means, or the like, to aid in separating the follower 24 from the assembly.

In FIG. 7 I have shown an alternate form of my improved cover assembly wherein the follower 24b is formed separate from the flange 14 or rib 20. It is removably disposed within the assembly 10 within a chamber 32 formed therein by the upper supporting surface 34 of the rib 20, the inside wall surface 36 of the flange 14, and the undersurface 38 of the body portion 12. As shown, the follower 24b is supported within the chamber 32 upon the rib 20.

In use, the cover assembly 10 is secured to one end of a cylindrical container in any conventional manner. I have, however, for purposes of illustration shown the assembly 10 secured to a container of the type having an annular bead 40 surrounding the opposite ends thereof. As my novel cover assembly is preferably made of a flexible material such as polyethylene or the like, it is adapted to be snapped over the end of the cylindrical container with the rib 22 engaging the underside of the bead and bearing against the outer wall of the container, as best seen in FIGS. 5 to 7. So positioned, my novel cover assembly is securely, but removably, affixed to the container, the follower element 24 supported within the assembly between the annular body portion 12 thereof and the top or lid of the unopened container. When it is desired to use the contents of the container, the cover assembly may be readily removed therefrom and the container opened in a conventional manner. Usually, the container top or lid is pierced by a wheel-type can opener which removes the top portion of the container, leaving the bead intact to cooperate with the rib 22 when the cover 10 is replaced.

As the contents of the container are used and the level thereof falls lower and lower in the container, the volume of air entrapped between the cover and the level of the contents increases. As previously stated, such entrapped air has a deleterious affect upon many goods, including coffee or the like. Therefore, upon removing the metal lid from the container and before replacing the cover 10 thereon, the follower 24 is preferably removed from the assembly and placed within the container as shown in FIG. 4. The cover 10 may then be snapped to the container top in the manner described. It can be seen that as the follower element 24 rests on the contents of the container, it functions to shield the contents from the atmosphere entrapped therein between the surface of goods and the cover 10, thus substantially retarding the deleterious effect of exposure to the atmosphere.

It should be noted that the peripheral edge portion of the follower 24 may be shaped as required for various applications. If desired, the peripheral edge portion may be feathered for greater flexibility, or be enlarged cross-section for rigidity. However, in any event it is preferable that the diameter of the follower be only slightly less than the inside diameter of the container to minimize exposure of the contents thereof to the atmosphere. It should be noted, however, that in normal use there should be sufficient clearance between the edge of the follower and the inside wall to permit the escape of air as the follower is positioned within the container. If a greater degree of shielding should be required for certain goods, the diameter of the follower 24 may be greater than the inside diameter of the container. By feathering the peripheral edge portion, and by careful insertion and removal of the follower, a substantially complete shielding may be effected.

We claim:

1. A cover assembly for a cylindrical container comprising an annular body portion surrounded by a flange on the periphery thereof, one edge of said flange being formed integral with said body portion and the other edge of the flange terminating outwardly thereof and lying in a plane substantially parallel with the plane containing the said periphery of the body portion, a removable, annular follower element spaced from and substantially coaxial with said body portion, supporting means associated with said flange disposed intermediate the edges thereof arranged and constructed to support the said follower element between the body portion and said plane containing the outer edge of the flange, and container engaging means on said flange operative to removably secure the cover to an end of a cylindrical container.

2. The subject matter of claim 1 wherein the said follower element is formed integral with the said flange and said supporting means comprise an area of reduced cross-section at the periphery of the follower element, said area of reduced cross-section acting as a tear strip to permit complete separation of said follower element from said flange.

3. The subject matter of claim 1 wherein the said supporting means comprises an inwardly extending annular rib surrounding the flange, said rib being integral with the said follower element, and an area of reduced cross-section surrounding the periphery of said follower element permitting complete separation of said follower element from said rib at said area of reduced cross-section.

4. The subject matter of claim 3 wherein the diameter of the follower is less than the inside diameter of the cylindrical container to which said assembly is removably secured whereby said follower may be readily received within the cylindrical container.

5. The subject matter of claim 1 wherein the said supporting means comprises an inwardly extending annular rib surrounding the flange and formed integral therewith and terminating in spaced relation from said flange to form a supporting surface substantially normal thereto, a chamber formed by said supporting surface, flange and body portion constructed and arranged to receive said follower element therein, said follower element being supported within said chamber upon said supporting surface, and said supporting surface being dimensioned to permit ready removal of the follower from said chamber.

6. The subject matter of claim 5 wherein the diameter of the follower is less than the inside diameter of the cylindrical container to which said assembly is removably secured whereby said follower may be readily received within the cylindrical container.

No references cited.

JAMES B. MARBERT, *Primary Examiner.*